June 17, 1924.

A. L. TRAILOR ET AL

ROTARY FISHING TOOL

Filed Aug. 29, 1923    2 Sheets-Sheet 1

A. L. Trailor,
J. J. Jones,
Inventors

By

Attorney

June 17, 1924.
A. L. TRAILOR ET AL
ROTARY FISHING TOOL
Filed Aug. 29, 1923
1,498,250
2 Sheets-Sheet 2
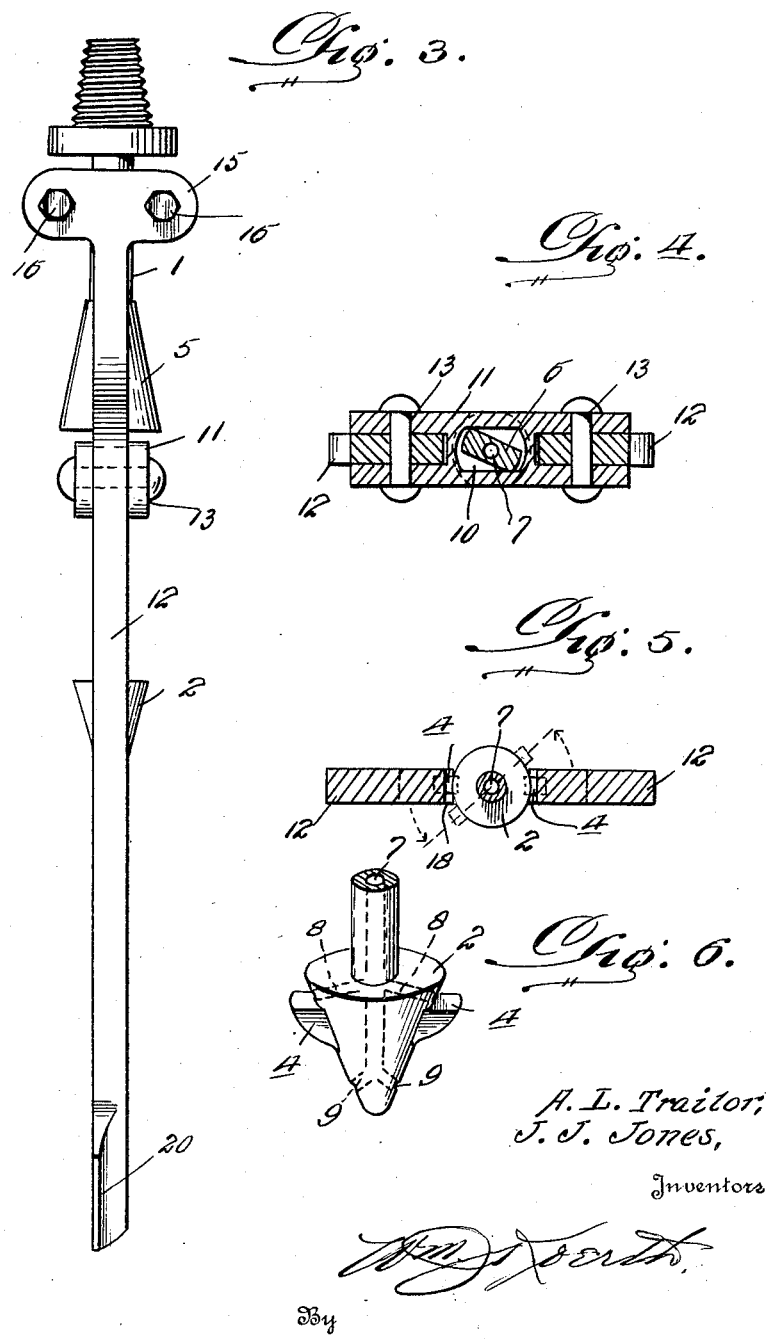
A. L. Trailor,
J. J. Jones,
Inventors Patented June 17, 1924.

1,498,250

UNITED STATES PATENT OFFICE.

ALBERT L. TRAILOR AND JOHNIE J. JONES, OF WICHITA FALLS, TEXAS; SAID TRAILOR ASSIGNOR OF ONE-HALF OF HIS INTEREST TO SAID JONES.

ROTARY FISHING TOOL.

Application filed August 29, 1923. Serial No. 659,942.

*To all whom it may concern:*

Be it known that we, ALBERT L. TRAILOR and JOHNIE J. JONES, citizens of the United States, residing at Wichita Falls, in the county of Wichita and State of Texas, have invented certain new and useful Improvements in Rotary Fishing Tools, of which the following is a specification.

Our invention has reference to a fishing tool for use in oil or other wells for recovering lugs, parts of machinery, etc. which may have fallen through the well casing.

An object is the provision of a fishing tool comprising essentially a jaw carrying shank provided with means for holding the jaws in open position, when the tool is inserted in the well casing or hole as well as with means for swinging the jaws toward each other to grip an article therebetween when brought into contact with such article so that the same may be fished out of the well.

A further and important object is to produce a fishing tool comprising a pair of pivotally supported jaws, a shank therebetween, means on the shank for holding the jaws in open position or to cause the swinging of the jaws toward each other to contact with the article to be fished, and wherein the jaws have outer and lower cutting surfaces so that the tool when rotated will plow through caved-in well holes, and also wherein the jaws are constantly lubricated in the passage of the tool into the well hole to facilitate the free turning thereof.

A still further object is the production of a fishing tool characteristic of simplicity in construction, cheapness in manufacture, ease in operation and thorough efficiency for the purpose designed.

The foregoing and many other objects which will appear as the nature of the invention is better understood, may be accomplished by a construction, combination and operative association of parts, such as is disclosed by the drawings which accompany and which form part of this application.

In the drawings:—

Figure 1 is a front elevation of a fishing tool in accordance with this invention, the jaws being in open position.

Figure 2 is a similar view with the jaws in closed position, parts being in section.

Figure 3 is an edge view of the improvement.

Figure 4 is a sectional view on the line 4—4 of Figure 1.

Figure 5 is a similar sectional view on the line 5—5 of Figure 1.

Figure 6 is a perspective view of the lower end of the stem.

The stem 1 of the improvement has at its upper end a shoulder from which extends a conical screw designed to be received in the socket of the operating stem section. The stem is round in cross section, and has its lower end formed with a conical head 2. The head, below the upper flat face thereof has its sides formed with oppositely disposed lugs 4—4. At a suitable distance from its upper threaded and shouldered end the stem 1 is integrally formed with a frusto-conical enlargment 5 tapered in an opposite direction from the head 2. Below the cone-shaped portion 5 the stem is of a cross sectionally rectangular formation, as indicated by the numeral 6. The stem is provided with a central bore 7 having branches 8 that pass through the head 2 directly over the lugs 4, and lower branches 9 arranged below the lugs.

The rectangular portion 6 of the stem 1 is received through a rectangular opening 10 in a metal block 11. The opening 10 is of a size to freely receive the rectangular portion 6 of the stem therethrough so that when the stem is turned in one direction the diagonally opposed and preferably rounded corners of the portion 6 will contact with the side walls provided by the opening so that the block 11 will be caused to turn with the stem. Suitable means is, of course, provided for rotating the stem, and likewise suitable means is provided for directing a flow of water through the bore 7 of the stem and through the angle passages 8 and 9 thereof.

The block 11 has its ends bifurcated to receive therein and to have pivoted thereto jaws 12 respectively. Each of the jaws is of a similar construction.

The inner face of each jaw 12, above its pivotal connection 13 with the block 11, has its inner edge disposed at an angle, as indicated by the numeral 14, and these angle surfaces are at all times in contacting engagement with the conical enlargement 5 on the stem. Above the angle surfaces 14 the jaws are reduced and are formed with laterally extending ears 15. The ears, adjacent their ends are provided with aligning openings, the said openings being preferably rounded from their center to the opposite faces of the ears, as indicated by the dotted lines in Figures 1 and 2 of the drawings. There are passed through each aligning pair of openings in the respective ears headed bolts 16 which are engaged by nuts 17. The bolts straddle the upper portion of the stem.

From the angle surfaces 14 the inner edges of the jaws are rounded or concaved and terminate in inwardly directed lips 18, the lower walls of which being straight so that the same will engage with the upper straight surfaces of the lugs 4 when the stem and jaws are in the position illustrated in Figure 1 of the drawings. From the lugs both the inner and outer edges of the jaws 12 are disposed at a slight inward curvature, but the lower ends of the said jaws have their inner ends rounded, as at 19 and their outer edges arranged at an angle, as at 20. By reference to Figure 3 of the drawings, it will be noted that the edges 20 are reduced from one side of the jaws proper to provide cutting edges. By reference to Figures 1 and 2 of the drawings it will be noted that the rounded edges 19 are disposed at a transverse inclination to provide further cutting edges.

Inward of the rounded ends 19, the cooperating jaws 12 are toothed, as at 21 to effectively engage an article to be fished from a well casing or hole.

Before the fishing tool is let into the well the stem 1 is moved to the position illustrated in Figure 1 of the drawings. This causes the conical head or spreader element 2 of the stem 1 to contact with the confronting surfaces of the lips 8 and as previously stated, to allow the lugs 4 to underlie and contact with the said lips 18. When in such position the substantially rectangular portion 6 of the stem is arranged angularly with respect to the jaws, as illustrated in Figure 4 of the drawings. The tool, after additional sections are attached to the stem 1, is let in the well with the jaws in open or expanded relation. The stem is turned to impart a light rotary motion to the jaws. This is incident to the contacting engagement of the rounded corners of the portion 6 of the stem 1 with the opposed walls provided by the opening 10 in the block 11. Because of the cutting edges of the lower ends of the jaws the tool will plow its way through obstructions or cave-ins in the well hole. The tool is materially aided in its operation by the lubricant being constantly directed against the jaws thereof. By directing the lubricant against the upper surfaces of the lugs 4, the said lugs will freely travel off of the lips 18 when the stem 1 is turned in a clock-wise direction. Such turning of the stem will arrange the lugs 4 angularly with respect to the lips 18, and the weight of the jaws together with that of the block will cause the said jaws to move downwardly on the stem, bringing the spreader head 2 above the lips 18, and causing the angle surfaces of the jaws 12 to slide on to the widened lower surface of the frusto-conical element 15 of the stem, thus causing the active or toothed ends 21 of the jaws to be brought toward each other to clamp the article to be fished therebetween. An upward pull on the stem will cause the further swinging of the active ends of the jaws toward each other so that a more effective gripping engagement will be obtained by the jaws upon the article to be fished.

While we have illustrated a satisfactory embodiment of our improved device, our features of invention are capable of extended application, and we do not wish to be limited to the specific structure shown and described.

Having described the invention, we claim:—

1. In a rotary fishing tool, gripping jaws, a slotted spacer block to which the jaws are pivoted, a stem having a portion passing freely through the slot in the block to contact the side walls thereof to cause the rotation of the jaws with the stem when the latter is turned in one direction, means on the stem for sustaining the jaws in open position when said stem is so turned, means for releasing the spacing means when the stem is turned in a second direction, to permit of the gravitating of the jaws on the stem, and means on the stem for wiping engagement with the jaws to hold the same in closed position.

2. In a rotary fishing tool, gripping jaws, a slotted spacer block between the jaws and to which said jaws are pivoted, a stem having a portion passing freely through the block to contact the side walls of the slot thereof to cause the jaws to revolve with the stem when the latter is turned in one direction, means on the lower end of the stem engageable with the jaws for holding the same in open position, means on the stem also engageable with the jaws for sustaining the latter in closed position when said stem has been turned in a second direction to release the first mentioned means and the jaws have gravitated downwardly on the stem or the stem has been pulled outwardly thereof, and means for limiting the swinging of the jaws toward each other.

3. In a rotary fishing tool, a pair of gripping jaws having cutting surfaces at their active ends and at their outer corners and having teeth on their inner faces in said ends, a slotted block to which the jaws are pivoted, a stem having a portion passing through the block for contacting the side walls of the slot therein when turned in one direction to cause the jaws to rotate with the stem, means on the stem engageable with the jaws for holding the same in spread condition, said means susceptible to disengagement with the jaws when the stem is turned in an opposite direction, means on the stem engageable with the jaws for holding the same in closed position when the jaws are permitted to gravitate on the stem by the release of the first mentioned means, and means for feeding a lubricant through the stem on to the jaws.

4. In a rotary fishing tool, a pair of jaws having lower and outer cutting surfaces and inner gripping teeth, a slotted spacer block to which the jaws are pivoted, a hollow stem having a rectangular portion passing through the slotted block and designed to contact with the side walls thereof to cause the jaws to be turned with the stem when the latter is rotated in either direction, means on the stem wedgingly engageable with the jaws for holding the same in spread condition, means on the last mentioned means supporting the jaws in such position, means on the stem for wedgingly engaging the jaws to hold the same in closed position when the stem is turned anti-clockwise to release the jaw spreading and sustaining means and to permit of the jaws gravitating outwardly on the stem, means centralizing the stem with respect to the jaws and for limiting the swinging of the jaws toward each other, and means for feeding a lubricant through the shank on to the jaws.

5. In a fishing tool, a pair of spaced jaws having laterally extending ears at their upper ends, spaced headed elements having their shanks passing freely through said ears, said jaws having inner angle edges below the ears and lips below said angle edges, said jaws having their active inner edges toothed and rounded therefrom to provide cutting surfaces, the outer edges of which being arranged at an inclination and also providing cutting surfaces, a slotted spacer block pivotally secured to the jaws above the lips, a hollow stem having a rectangular portion received through the slot, a conical head provided with a central port therebelow having lugs thereon, said head designed to engage the lips and the lugs to underlie said lips for holding the jaws in open position when the stem is turned in one direction and by virtue of such turning to cause the rectangular portion thereof to contact the side walls of the slotted block to influence the jaws to turn with the stem, a conical enlargement on the stem disposed opposite the angle edges thereof and designed to wedgingly engage therewith when the stem is turned in an anti-clockwise direction to release the conical head and lugs from the lips and to permit of the jaws to gravitate on the stem, and means for feeding a lubricant through the stem on to the lips and jaws.

In testimony whereof we affix our signatures.

ALBERT L. TRAILOR.
JOHNIE J. JONES.